Dec. 9, 1924. 1,518,232
E. TEITZ
SIGNALING DEVICE
Filed Aug. 3, 1923
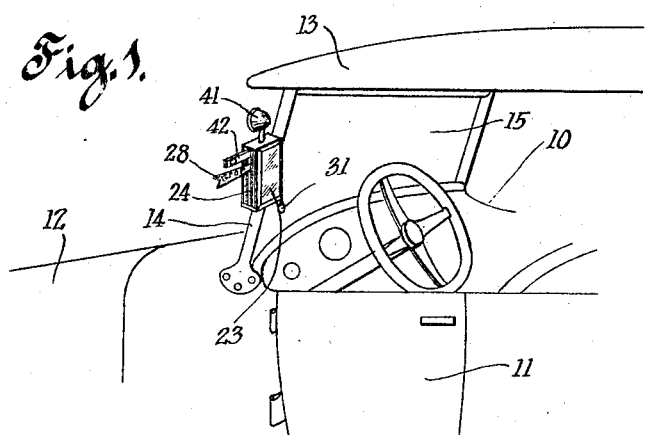
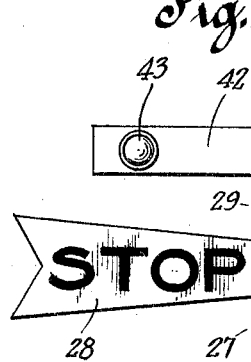
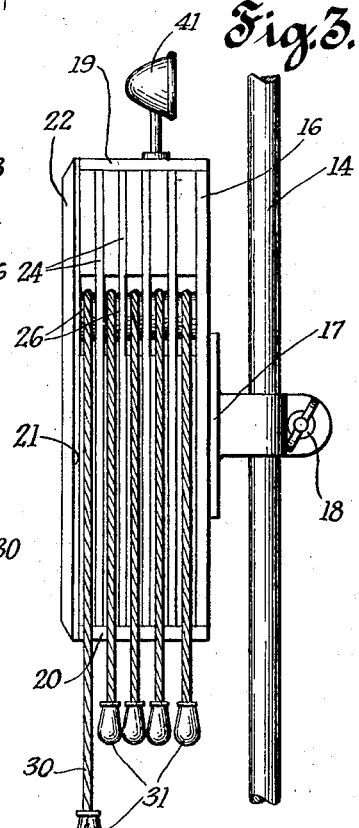
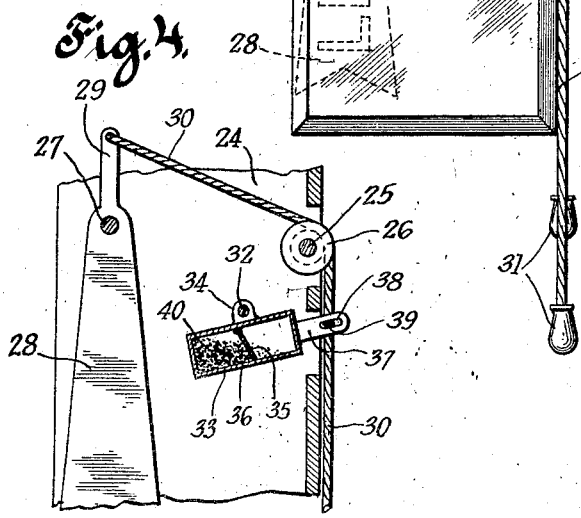
INVENTOR
Emanuel Teitz
BY
Fredk C. Fischer
ATTORNEY Patented Dec. 9, 1924.

1,518,232

UNITED STATES PATENT OFFICE.

EMANUEL TEITZ, OF NEWARK, NEW JERSEY.

SIGNALING DEVICE.

Application filed August 3, 1923. Serial No. 655,412.

*To all whom it may concern:*

Be it known that I, EMANUEL TEITZ, a citizen of the United States, a resident of Newark, in the county of Essex and State of New Jersey, have invented certain new and useful Improvements in Signaling Devices, of which the following is a specification.

This invention relates to improvements in devices for visually indicating the proposed movement of a vehicle by its operator, tending to minimize the danger of collision by other vehicles and pedestrians in the vicinity.

One of the objects is to provide a device, preferably located at the side of a vehicle, near the front, where it is conspicuous, that is capable of exhibiting all of the several sign bearing signals that are required and rendering it unnecessary to extend the operator's hand in the awkward but customary manner which now prevails.

Another purpose is to produce an apparatus for accomplishing such results, the characteristic feature of which is simplicity in structure and operation.

A further aim is to so arrange the signals that the same automatically disappear upon their release and without volition on part of the operator.

A still further object is to provide means which retard the recedence of the signal, preventing noise and jar.

Other objects are to combine with the signal casing means, as a mirror, by which a view of the road behind the vehicle can be conveniently obtained, and further in the provision of lights for illuminating the signals when displayed in the dark.

These several objects are attained by the novel construction, arrangement and combination of parts hereafter described and shown in the accompanying drawing, forming a material part of this disclosure, and in which:—

Figure 1 is a fragmentary perspective view of a conventional type of vehicle showing the application of the invention.

Figure 2 is an enlarged side elevational view of the device, one of the signals being shown in an extended position.

Figure 3 is an edge view of the same.

Figure 4 is a fragmentary sectional view looking from the inner side of the casing, showing a modification in construction.

In the drawing the numeral 10 designates in general the body of an automobile having a door 11, hood 12 and cover 13, supported at the front by posts 14 between which is a transparent wind shield 15.

Attached to the post 14, or other convenient stationary upright element, close to the driver, is a casing composed of a rigid back plate 16 having at its center a clamp bracket 17 provided with means, as the nut 18, to be firmly secured to the post.

A top plate 19 and bottom plate 20 extend outwardly to the front 21 which is provided with a frame 22 carrying a mirror 23 directed towards the rear so that a view can be had by the driver.

Extending in vertical spaced relation between the plate 19 and 20 are a series of partitions 24 through which passes a spindle 25 closely adjacent the inner edge of the frame and rotatably mounted on the spindle are grooved pulleys 26, one in each compartment formed between the partitions and side walls respectively.

In the opposite side of the plate is another spindle 27 and hanging loosely pendant on it are a series of signal plates 28 displaying such words as to signify the intention of the driver, as for instance Stop, Left, Right, Go, Back, it being understood that one signal plate is in each compartment.

An arm 29 extends from the end of each signal plate and attached to the end of each arm is a flexible cable or cord 30, trained over the corresponding pulley 26 and thence passing down adjacent the inner edge of the casing to a knob, handle or loop 31.

All of these several knobs are in a row conveniently reached by the driver and to operate the same it is only necessary to grasp the handle engaged with the desired signal and draw it down, obviously extending the signal horizontally into position to be clearly seen as illustrated in Figure 2 and upon releasing the knob the signal will immediately be returned into the casing by gravity.

In order to retard the action of the signal plate when suddenly released, an impedance may be interposed, as shown in Figure 4, in which a spindle 32 is fixed in the casing to pass transversely through the several compartments and pivoted on the spindle are hollow containers 33 by their lugs 34.

In each container is a gravity operated shutter 35 pivoted at its upper edge and containing a small opening 36, this shutter being approximately at the center and filling the interior of the container, its length being such as to prevent completely turning therein.

An arm 37 is secured to one end of the container, the arm having a slot 38 to engage a pin or the like 39 fixed in the element 30, so that as the knob 31 is pulled down, the container will be tilted on its pivot 32, causing its contents 40, as shot, sand, etc., to open the shutter and run by gravity to the lower portion of the container, the shutter then closing and confining the material until the knob is released.

The weight of the signal plate upon its release, will tend to tilt the container back to its normal angular position, but as the material can only trickle slowly through the orifice 36, its return action is materially retarded.

In the embodiment shown a spotlight 41 is arranged over the casing and an arm 42 extending from the casing supports a lamp 43 by which the signals may be illumined at night.

While certain preferred embodiments of this device have been shown and described, it will be understood that changes in the form, arrangements, proportions, sizes and details thereof may be made without departing from the scope of the invention as defined in the appended claims.

Having thus described my invention what I claim as new and desire to secure by Letters Patent, is:—

1. A vehicle signal comprising a casing rigidly extended from the side of the vehicle, a plurality of similarly shaped signal plates bearing unlike inscriptions pivoted to hang normally pendant from a common axis within said casing, flexible connections engaging said plates opposite their pivotal points, supports for said connections, pulls at the opposite ends of said connections, an arm projecting outwardly from the upper portion of said casing over the path of exposed plates, means in said arm for illuminating said signal plates when extended and gradually acting means for returning the extended plate slowly into its original position of rest.

2. A vehicle signal comprising a casing rigidly extended from the side of the vehicle, a plurality of similarly shaped signal plates bearing unlike inscriptions pivoted therein, means for selectively extending said plates, and gradually acting means for retarding the return of said plates subsequent to the release of said extending means.

3. A vehicle signal comprising a casing attached to the side of the vehicle and having a mirror facing rearward, a plurality of vertical compartments in said casing, a signal plate and pulley disposed in opposite sides in each compartment, flexible means attached in each plate trained over the corresponding pulley for extending each plate selectively, a gradually acting impedance for retarding the return by gravity of each plate, a rigid arm projecting from said casing over the plates when extended, and means for illuminating the exposed plates carried by said arm.

4. A vehicle signal comprising a casing having a plurality of vertical, spaced partitions forming compartments, manually operable signal plates in each compartment, a tilting container pivoted adjacent each plate, said container carrying a heavy granular substance, a shutter pivoted in the container, said shutter having a restricted aperture, and connections between said container and the operating means for said shutters whereby said containers are shifted on their pivots coincidentally with the movement of said signal plates.

This specification signed and witnessed this 2nd day of August, 1923.

EMANUEL TEITZ.

Witnesses:
  FRED'K C. FISCHER,
  FERDINAND NOLL.